March 4, 1958 W. J. GRUEN ET AL 2,825,756

AUTOMATIC GAIN CONTROL OF KEYED AUTOMATIC GAIN CONTROL AMPLIFIER

Filed Nov. 15, 1951 2 Sheets-Sheet 1

Inventors:
Wolf J. Gruen,
Raymond F. Foster,
by Merton D. Moore
Their Attorney.

Inventors:
Wolf J. Gruen,
Raymond F. Foster,
by Merton D. Moore
Their Attorney.

United States Patent Office 2,825,756

Patented Mar. 4, 1958

2,825,756

AUTOMATIC GAIN CONTROL OF KEYED AUTOMATIC GAIN CONTROL AMPLIFIER

Wolf J. Gruen and Raymond F. Foster, Syracuse, N. Y., assignors to General Electric Company, a corporation of New York Application November 15, 1951, Serial No. 256,422

2 Claims. (Cl. 178—7.3)

Figure 1:
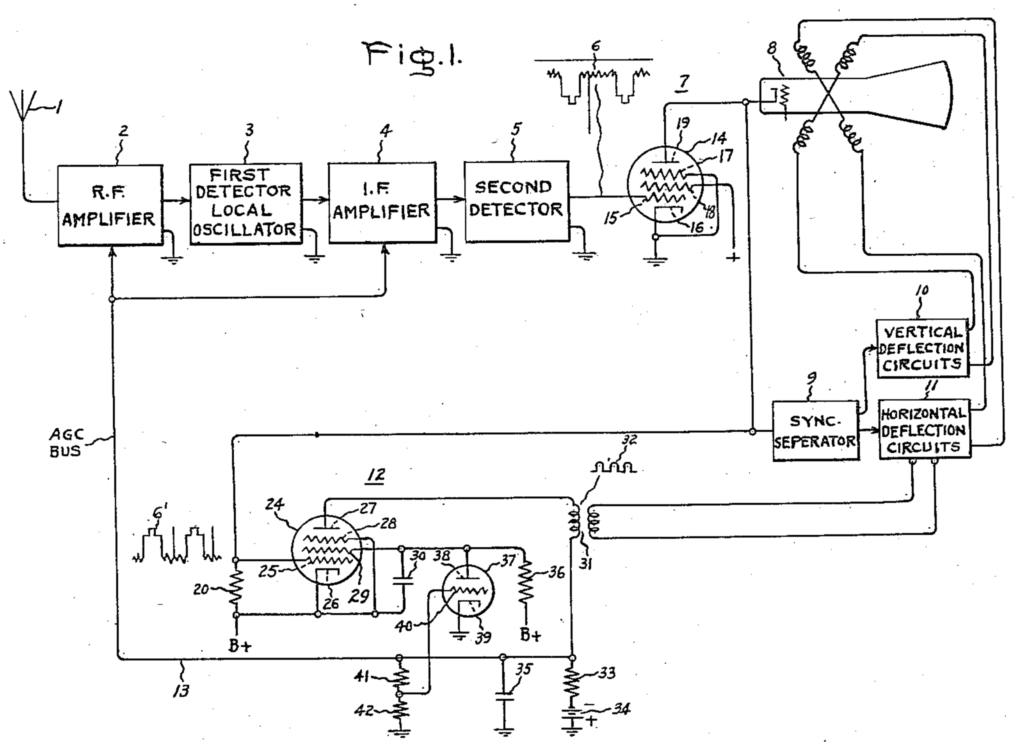

This invention relates to automatic gain control circuits for use in signal amplifying systems and has particular reference to television broadcast receivers.

Automatic gain control amplifiers have been employed in television broadcast receivers to provide an amplified gain control voltage whose amplitude varies directly with that of the received signal carrier. This voltage is applied as a negative bias voltage to the input circuits of some or all of the radio frequency and intermediate frequency amplifier stages of the receiver so that signals of a range of received strengths may be amplified by different amounts to the same order of magnitude. Since it is usually desirable to operate the video discharge device amplifier of such a receiver as a noise limiter, the detected composite video signals with negative going synchronizing pulses are preferably applied to the input circuit of the video amplifier at such an amplitude that the anode current cutoff in the video amplifier tube is reached at or near the peaks of the synchronizing pulses. Noise impulses which would otherwise extend beyond the peaks of the synchronizing pulses and interfere with the operation of the synchronizing pulse separator circuits are thus clipped near the tips of the synchronizing pulses.

The range of received signal strengths within which this ideal operating condition prevails, however, has usually been limited by the amount of amplifier gain which it is economically feasible to incorporate in a receiver. Briefly stated, to develop gain control voltages corresponding to received signal strengths, certain minimum signal increments or voltage differences between signals of different received strengths have been required at the video amplifier input circuit. This minimum voltage difference may be so large for weak signals that the tips of their synchronizing pulses do not reach near enough the video amplifier anode current cutoff point to permit good noise limiting. Accordingly, it is desirable that the gain of the amplifier stages preceding the video amplifier should be automatically controlled so that the tips of the synchronizing pulses of signals of varying received strength are supplied to the input circuit of the video amplifier at an amplitude level uniformly near the anode current cutoff input voltage of the video amplifier.

It is therefore a primary object of this invention to provide an improved automatic gain control circuit for television receivers of composite video signals for providing amplification to a substantially uniform level having a wide range of received signal strengths.

It is a further object of this invention to provide an automatic gain control system which is compensated to permit maximum noise limiting in the video amplifier for received signals of a wide range of received amplitude levels.

It is a still further object of this invention to provide an automatic gain control amplifier which is itself responsive to changes in received signal strength to provide a gain control voltage which permits more effective noise limiting in the video amplifier to the receiver.

It is another object of this invention to provide an automatic gain control amplifier for an amplifying system having an operating characteristic which varies with the amplitude of amplified signal from the amplifying system.

In accordance with our invention, an automatic gain control electron discharge amplifier is employed in a television receiver to produce an automatic gain control bias voltage which also controls the operating characteristics of the gain control amplifier. In a particular embodiment the composite video signal appearing across the anode output resistor of the video amplifier discharge device is applied to the input circuit of an automatic gain control amplifier pentode whose anode is preferably keyed on only during the duration of the horizontal line blanking pulses. The gain control amplifier output voltage is employed to decrease the voltage applied to the screen grid of the pentode by an amount which varies inversely with the gain control voltage, the screen voltage thus decreasing as the gain control amplifier output voltage decreases. To provide the large gain control bias required for a strong received signal, the gain control amplifier input voltage must reach relatively far into the conduction region of the gain control amplifier tube, and the screen voltage of the tube is relatively unaffected. The lower gain control voltage required for weaker signals tends to be even further reduced, however, due to the lower screen voltage applied to the gain control amplifier pentode. To provide the gain control bias necessary to stabilize the gain control feedback system, the gain control amplifier input signal must therefore reach further into the conduction region of the gain control amplifier tube. This condition is satisfied, however, only when a more negative going signal is applied to the input of the video amplifier stage, thus causing the tips of the synchronizing pulses of the video amplifier input signal to be at or near the control voltage corresponding to anode current cutoff. Due to the varying screen voltage of the gain control amplifier, stabilized operation of the gain control feedback system for a given received signal is attained only when the amplitude of the detected composite video signal is large enough to provide satisfactory noise clipping, thus affording better operation of the synchronizing pulse separation circuits.

Figure 2:
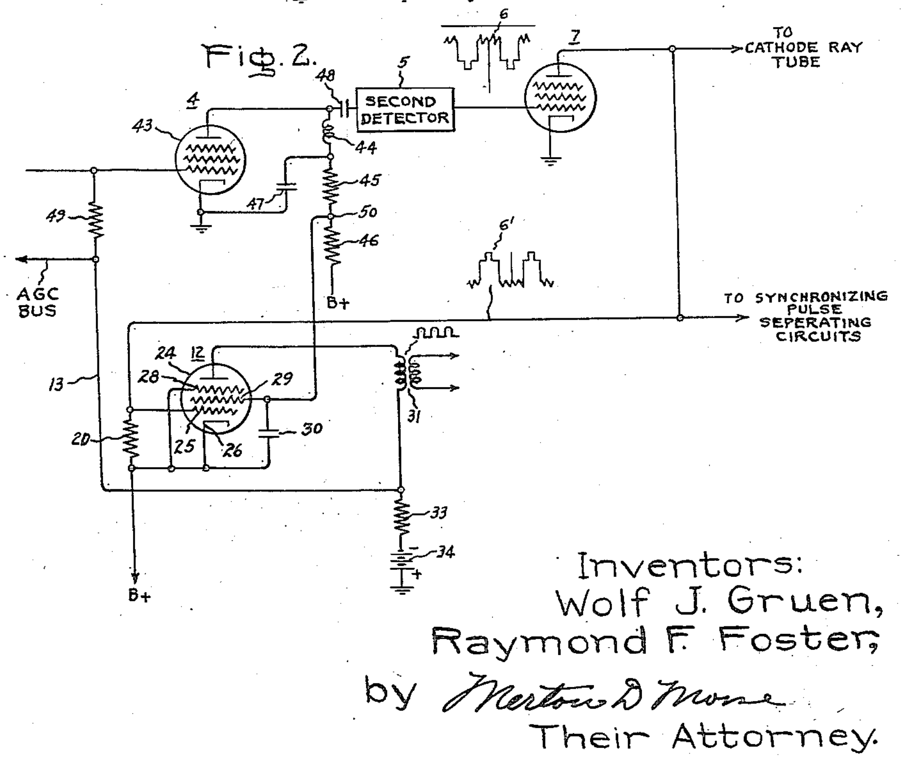
Figure 3:
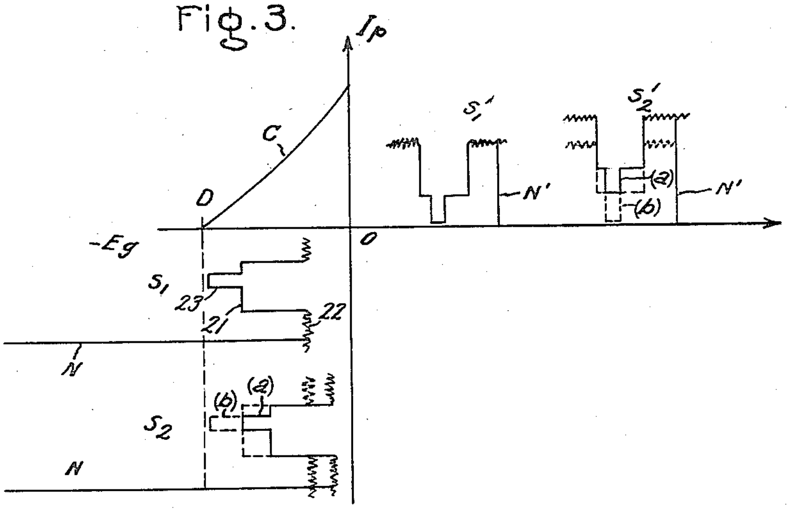
Figure 4:
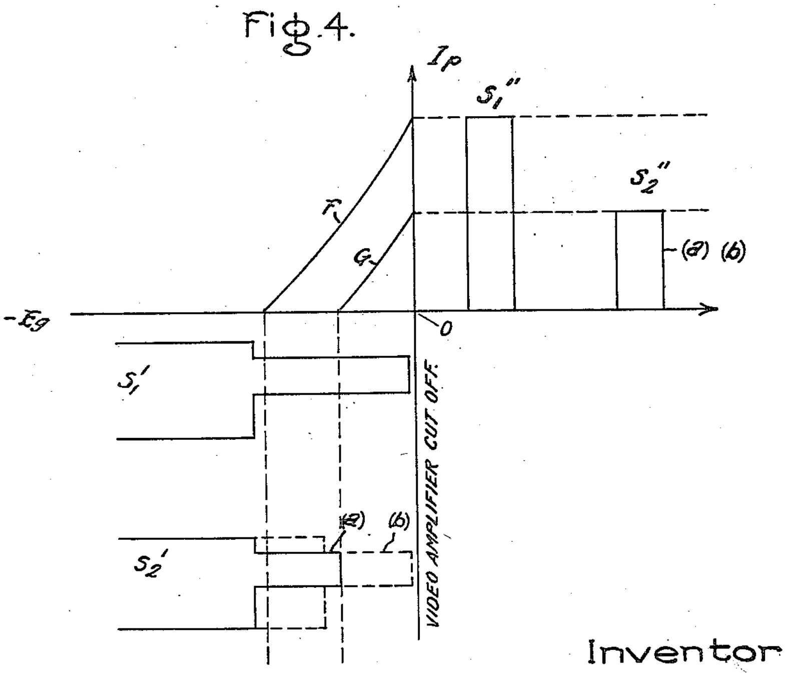

The novel features believed to be characteristic of the invention are set forth with particularity in the appended claims. The invention itself, however, both as to its organization and method of operation, together with further objects and advantages thereof, may best be understood by reference to the following description taken in connection with the accompanying drawing, in which Fig. 1 is a circuit diagram, partly in block form of television receiving apparatus having an automatic gain control system embodying the invention, Fig. 2 is a circuit diagram of another automatic gain control system embodying the invention, Fig. 3 is a grid voltage-anode current diagram illustrating the noise limiting operation of the video amplifier of Figs. 1 or 2, and Fig. 4 is the corresponding diagram for the automatic gain control amplifier of Figs. 1 or 2.

Referring now to Fig. 1, signals received on antenna 1 are amplified in a radio frequency amplifier 2 having one or more vacuum tube amplifier stages. The amplified signal is then converted to an intermediate frequency by heterodyning it with oscillations produced by a local oscillator, circuits for performing these functions being indicated by block 3. The intermediate frequency wave is then amplified in the intermediate frequency amplifier 4, which comprises at least one vacuum tube amplifying stage, and supplied to the second detector 5 where the intermediate frequency carrier is demodulated. The demodulated composite video signal indicated at 6, which is negative with respect to ground with negative synchronizing pulses, is then supplied to the control electrode of the video amplifier 7.

The video amplifier output circuit is coupled in a suitable manner to the electron gun of a cathode ray tube 8, and to the synchronizing pulse separator circuits 9, also shown in block form. At 9 the synchronizing pulses are separated from the amplified composite video wave and supplied to the vertical deflection circuits 10 and horizontal deflection circuits 11. These circuits are respectively coupled in a conventional manner to the vertical and horizontal deflection coils of the cathode ray tube 8. The audio stages of the receiver are not shown in the drawing since they bear no relation to an understanding of the present invention.

The output signal from the video amplifier 7 is also supplied to the input circuit of the gain control amplifier 12. The control voltage developed in the output circuit of the automatic gain control amplifier is supplied by an automatic gain control bus 13 in a conventional manner as a negative bias voltage to the control electrodes of the discharge devices of stages 2 and 4, as indicated in Fig. 1. It is to be understood, of course, that the gain control voltage may be applied in whole or in part to whichever amplifier stages are chosen for automatic gain control operation. The feedback circuit from the video amplifier 7 through the automatic gain control amplifier 12 and bus 13 completes the automatic gain control loop. The gain control system of our invention controls the gain of this loop to permit more reliable operation of the synchronizing pulse separating circuits through improved noise limiting in the video amplifier.

As shown in Fig. 1, a discharge device 14, which may suitably be a conventional pentode vacuum tube, is employed in the video amplifier stage 7. The detected signal 6, which has a negative potential with respect to ground, is directly coupled to the control grid 15 of the amplifier tube with the synchronizing pulses negative going, the cathode 16 being connected to ground. The pentode suppressor grid 17 is connected to the cathode in a conventional manner and the screen grid 18 is connected to a source of positive voltage. The anode 19 of the device 14 is connected to a source of positive voltage B+ through the anode or output resistor 20. The phase of the amplified signal voltage 6' appearing across the anode resistor 20 is inverted with respect to the input signals 6, and hence the synchronizing pulses are positive-going at the anode of the video amplifier pentode 14.

The noise limiting function of the video amplifier 7 is illustrated by Fig. 3. The curve C of Fig. 3 is a grid voltage-anode current characteristic in which the abscissa represents values of grid bias voltage $E_g$ and the ordinate represents values of the plate or anode current $I_p$ for a given screen voltage supplied to the screen grid 18. This characteristic curve C intersects the abscissa at D, the grid voltage at D corresponding therefore to the anode or plate current cutoff for the video amplifier. An input signal $S_1$ having the general wave form and polarity of the illustrated composite video signal 6 is represented below the abscissa, with the blanking pedestal 21 extending in a negative direction from the video component 22 and the synchronizing pulses 23 projecting beyond the blanking pedestals. Random noise impulses occurring between the blanking pedestals, such as indicated by the letter N, may have an amplitude several times that of the synchronizing pulses. Assuming that the signal $S_1$ corresponds to the strongest signal that can be received at the antenna without overloading the video amplifier after the gain of the radio frequency and intermediate frequency stages has been decreased by the automatic gain control system, the value of the screen voltage applied to the screen 18 of the video amplifier pentode 14 is appropriately selected so that the characteristic curve C and the cutoff point D correspond to the voltage at or only slightly more negative than the tips of the synchronizing pulses 23 of the signal. The noise impulses N' in the amplified signal $S_1'$, which is the amplified signal appearing at the anode 19 of the video amplifier tube, are thus effectively limited to an amplitude which is substantially that of the synchronizing pulse tips. The operation of the video amplifier for the strong signal $S_1$ exemplifies the noise limiting function which is also desired for weaker received signals.

However, if the available gain is not sufficient to raise the amplitude of a weak received signal, such as shown as $S_2$ in solid outline (*a*) below the abscissa of Fig. 3, to the same amplitude as the strong signal illustrated at $S_1$, the tips of the synchronizing pulses of the weak signal are not sufficiently near the cutoff point B to provide good noise clipping. In the amplified weak signal $S_2'$ shown in Fig. 3 the noise impulse N' therefore extends a substantial distance beyond the synchronizing pulse tips. Under such operating conditions, the poorer noise limiting may affect the operation of the synchronizing pulse separating circuits, even though the noise itself, being in the "blacker than black" regions according to current broadcasting standards and having very little time duration, has little or no noticeable effect on the video information supplied to the cathode ray tube 8. If, however, the weak signal $S_2$ could be raised in amplitude to that indicated in dotted outline (*b*) in Fig. 3, so that the tips of its synchronizing pulses of weak signals are substantially as near the cutoff point B as for the strong signal $S_1$, good noise limiting or clipping would thus be obtained for weak signals.

Effective noise limiting in the video amplifier is made possible by the automatic gain control amplifier 12 of Fig. 1. The gain control amplifier comprises an electron discharge amplifying stage in which the discharge device may suitably be a conventional pentode vacuum tube 24. The amplified composite video signal 6' with positive-going synchronizing pulses which appears across the load resistor 20 is preferably supplied directly to the input circuit of the gain control amplifier pentode 24 by connecting the load resistor between the cathode 26 and control grid 25 of the pentode. The pentode 24 is preferably operated as a keyed amplifier, its anode 27 being supplied with the positive operating voltage only during periods corresponding to the period of the horizontal synchronizing pulses of the input signal. In this way, the gain control voltage reflects the signal amplitude, since the synchronizing pulses are at 100% of the carrier amplitude, and is not dependent upon the televised image content. The suppressor grid 28 is conventionally connected to the cathode 26 and the screen grid 29 is connected to a source of positive voltage whose amplitude is automatically varied, as will be explained hereinafter. A conventional bypass capacitor 30 is connected between the screen grid 29 and cathode 25.

The keying pulses may be suitably provided by a keying transformer 31 as shown in Fig. 1. The primary winding of the transformer is connected to the horizontal deflection circuits 11, which serve as a convenient source of horizontal line frequency pulses corresponding in frequency and phase with the line frequency synchronizing pulses of the composite video signal 6'. A series of positive going voltage pulses of a general wave form type indicated at 32 is impressed on the anode 27 of the gain control pentode to permit current flow in the anode circuit only for input pulses occurring during the line blanking periods. One end of the transformer secondary winding is accordingly connected to the anode 27 of the gain control amplifier tube 24, and the other end is connected to an output or anode resistor 33 which is connected to ground through a fixed bias voltage source conventionally indicated as a battery 34. A capacitor 35 shunts the load resistor 33 and battery 34 to filter or smooth the pulsating main control voltage developed across the resistor, this resistor-capacitor circuit having a time constant of about 1/30 of a second which allows it to filter the rectified current pulses in the output of amplifier 24 and still provide fast automatic gain control response. The automatic gain control bus 13 is connected to the terminal of the load resistor 33 between the resistor 33 and the secondary winding of the transformer 31, the output voltage of the automatic gain control amplifier thus being negative with respect to ground at the gain control bus. The fixed bias source is inserted with its positive terminal at ground to provide an additional initial negative bias to the automatic gain control radio frequency and intermediate frequency amplifier tubes for preventing excessive plate or anode current in those tubes when no signal is received from them for developing the automatic gain control voltage.

Referring still to Fig. 1, in accordance with our invention, the grid voltage-anode current characteristic of the automatic gain control amplifier tube 24 is automatically controlled to obtain more effective noise limiting in the video amplifier 7. This is most readily accomplished in the illustrated embodiment by varying the screen voltage applied to the gain control amplifier screen grid 29, it being understood, of course, that the potential of the screen grid rather than that of the anode largely determines the operating characteristic of a pentode when the anode is at or above a certain minimum potential. This condition is satisfied during the periods that the positive keying pulses are supplied to the control amplifier anode 27 of the pentode 24. The screen grid 29 is connected to a source of positive voltage B+ through a screen resistor 36. A variable impedance, which may suitably be an auxiliary electron discharge device such as a triode vacuum tube 37, has its anode 38 connected to the amplifier screen grid 29 and its cathode 39 connected to ground to provide, in series with the screen resistor 36, a voltage divider across the voltage source B+.

The impedance of the auxiliary device 37 is controlled by varying the voltage on its control grid 40. Thus, if the control grid 40 of the triode is at a sufficiently negative potential to prevent the triode from conducting, full screen voltage from the source B+ is applied to the screen grid 29 of the gain control amplifier pentode. However, as the voltage applied to the triode grid 40 is made less negative, the triode 37 draws an increasingly larger amount of current, thus increasing the voltage drop across the screen resistor 36 and decreasing the voltage applied to the screen. To vary the impedance of the auxiliary device 37 automatically, its control electrode 40 is supplied with the automatic gain control voltage or portion thereof so that the triode control electrode 40 becomes less negative as the amplitude of the gain control voltage decreases, thus decreasing the voltage applied to the screen 29 to a value below the full voltage of the source B+. A pair of voltage dividing resistors 41 and 42 is connected in series between the bus 13 and ground, and the control grid 40 of the triode 38 is connected to their common junction. By adjusting the relative values of resistors 41 and 42, the desired range of operating characteristics for the triode 38 is selected.

When a signal 6' of high received strength is applied to the input circuit of the automatic gain control pentode 24, a relatively high gain control voltage is developed across the output resistor 33. This negative bias, since it is relatively high in amplitude, when applied to the control electrode 40 of the auxiliary device 38, permits that device to draw little or no current, thus maintaining substantially full screen voltage on the pentode 24. However, when the input signal 6' in the automatic gain control amplifier has a lower received strength, the voltage on the automatic gain control bus is correspondingly less negative, thus resulting in a lower screen voltage applied to the screen 29 of the gain control amplifier pentode 24. The immediate effect of the lowered screen voltage is to decrease the gain control voltage on the bus 13 still further. As the feedback system stabilizes, the input signal at the gain control amplifier must be driven less negative, that is, to a more positive level, to produce the same anode current as when the screen voltage is at a higher level.

The significance of the operation of the sliding screen voltage supplied for the automatic gain control amplifier may be better understood by reference to Fig. 4 where two grid voltage-anode current characteristic curves of the gain control amplifier pentode 24 are illustrated. As in Fig. 3, the abscissa from $-E_g$ to zero represents values of input negative voltage, and the ordinate from zero to $I_p$ represents levels of the plate or anode current. Curve F is that obtaining when the full or maximum screen voltage B+ is applied to the gain control amplifier screen grid 29, and curve G corresponds to the decreased screen voltage automatically applied when a weaker input signal is received. Since the input signal to the gain control amplifier is the output signal of the video amplifier, there is a maximum negative amplitude for any portion of the gain control amplifier input signal 6' corresponding to the plate cutoff point D of the video amplifier 7. In the illustrated embodiment, this value occurs at zero volts input to the automatic control amplifier since the control grid 25 of the gain control amplifier is connected directly to the anode 19 of the video amplifier. Accordingly, the zero ordinate of Fig. 4 also represents the video amplifier cutoff point.

When a strong signal $S_1'$, corresponding to maximum received strength signal $S_1$ applied to the input of the video amplifier as illustrated in Fig. 3, is supplied to the control grid 26 of the gain control amplifier pentode 24, as shown below the abscissa in Fig. 4, the tips of the synchronizing pulses reach or almost reach zero voltage, which corresponds to the video amplifier cutoff point D. The value of the screen voltage B+ applied to the screen 29 of the pentode 24 is adjusted so that the plate current cutoff voltage of the characteristic curve F for the full voltage screen voltage occurs at or near the base of the synchronizing pulse of the maximum strength signal $S_1'$, preferably slightly above the blanking pedestal. Since the cutoff point D of the video amplifier tube 14 was adjusted to provide clipping of noise impulses at or very near the tip of the synchronizing pulses of the strong signal $S_1$, the tips of the synchronizing pulses of the strongest signal $S_1'$ will be correspondingly close to the zero ordinate in the gain control amplifier characteristic curves of Fig. 4. Accordingly, the amplified output signal in the gain control amplifier circuit, which signal appears across resistor 33, is a series of pulses $S_1''$ which represents most of the synchronizing pulse of the input signal 6'. In the embodiment described the noise pulses occurring between the blanking pedestals are not reproduced in the output of the gain control amplifier tube since it is conductive only during the blanking period.

If the same full screen voltage B+ were to be applied to the screen 29 of the gain control amplifier for a weak received signal $S_2$, the gain control feedback system stabilizes without bringing the weak signal $S_2$ up to the same amplitude of the strong signal $S_1$ at the video amplifier input circuit. Under such conditions, as shown in Fig. 3 where the weak signal $S_2$ is shown in solid outline (*a*), the tips of the synchronizing pulses do not reach the cutoff point D. The corresponding signal $S_2'(a)$ at the input of the automatic gain control amplifier will not drive the tube 24 fully conductive during the synchronizing pulse periods, with the result that the gain control output voltage pulse $S_2''$, is lower than the gain control output pulse $S_1''$. Since the low amplitude pulses $S_2''$ provide a relatively low gain control bias on the bus 13, a relatively higher receiver gain is maintained. However, as previously mentioned, since the receiver gain is limited, the amplification of the weak signal $S_2$ is stabilized at a value for which the tips of the synchronizing pulses at the video amplifier are at a materially greater distance from cutoff than for the first-mentioned strong signal $S_1$.

In accordance with the invention, however, when a sliding screen voltage is applied to the screen 29 of the gain control amplifier pentode 24, the initial gain control voltage pulse corresponding to the signal $S_2'$ results in a lower screen voltage being applied to the screen 29, hence changing the operating characteristic from the curve F to the curve G of Fig. 4, for which a less negative grid voltage is required for the same anode current. Accordingly, in order to satisfy the conditions of operation of the automatic gain control circuit, the weak input signal $S_2'$ at the control grid of the gain control amplifier tube 24 must extend further in the positive direction toward the zero voltage level to provide the gain control bias corresponding to the output pulse $S_2''$ for stabilized or steady state operation under a given signal strength. The signal $S_2'$ accordingly reaches the amplitude indicated by the dotted outline (*b*) in Fig. 4, which corresponds to the desired signal amplitude $S_2(b)$ in Fig. 3 for the video amplifier input circuit. In the process of reaching stable operation the lower screen voltage and the altered characteristic curve may be considered as first resulting in a reduced gain control voltage, thus causing a much larger gain in the controlled amplifier stages until the received signal $S_2$ is amplified to the level of the maximum strength signal $S_1$ at the video amplifier input circuit. A high degree of noise limiting is thus obtained for a substantial range of received signal strengths at the antenna of the receiver. As a result, the synchronizing pulse separating circuits are less likely to be adversely affected by noise impulses occurring during the intervals between the synchronizing pulses, since the noise pulses which might otherwise have an amplitude much greater than that of the synchronizing pulses is limited to substantially the amplitude of the synchronizing pulses themselves.

Referring now to Fig. 2, another circuit embodying our invention is illustrated in which a signal amplifier tube one of the radio frequency or intermediate frequency amplifier stages whose gain is controlled is employed as an auxiliary device which varies the voltage applied to the screen grid of the gain control amplifier pentode. Only those portions pertinent to illustrate the departure in circuit structure from Fig. 1 and to further facilitate the explanation of the circuit are shown in Fig. 2. Reference numerals employed in Fig. 1 are employed to designate similar circuit elements in Fig. 2.

Referring again to Fig. 2, the received signals are supplied as before to a stage of the intermediate frequency amplifier 4 employing a discharge device 43 which may suitably be a conventional pentode vacuum tube. For purposes of illustration, this selected stage is the last intermediate frequency amplifier stage before the second detector 5. The signal from the preceding amplifier stage is conventionally coupled to the control grid of the amplifier pentode. The cathode may be suitably connected to ground. The screen grid and suppressor grid connections of the pentode 43 are not shown in order to simplify the illustration of the circuit and are entirely conventional. The output circuit of the pentode 43 comprises an intermediate frequency tuning coil 44 connected in series through resistors 45 and 46 to a source of positive voltage B+. A bypass capacitor 47 is connected between the cathode and the junction of the coil 44 and resistor 45.

The signal output from the anode of the pentode 43 is coupled through a coupling capacitor 48 to the second detector 5. The demodulated composite video signal 6 from the detector is then supplied to the input circuit of the video amplifier 7 and the amplified video signal 6' is supplied to the input circuit of the gain control amplifier 12 as described in connection with Fig. 1. The load circuit of the gain control amplifier corresponds to that of Fig. 1 and the gain control voltage is supplied over the gain control bus 13 to the controlled stages. As shown in Fig. 2, this bus is connected through a resistor 49 to the control electrode of the amplifier tube 43.

In this embodiment, the variable screen voltage for the screen grid 29 of the gain control amplifier tube is supplied from the output circuit of the intermediate frequency amplifier tube 43. Accordingly, the screen grid 29 is connected at point 50 between the output resistors 45 and 46 and no auxiliary device corresponding to the triode 37 of Fig. 1 is utilized.

When a strong signal is received, the gain control amplifier tends to produce a large amplitude automatic gain control voltage which appears on the gain control bus 13. Since this voltage is negative with respect to ground, it decreases the gain of the intermediate frequency amplifier pentode 43, resulting in a lower current through its output circuit than when the automatic gain control voltage is less negative. Accordingly, the voltage drop across the load resistor 46 is relatively small and the voltage at point 50, which voltage is that supplied to the screen 29 of the gain control amplifier, is substantially the full voltage of the intermediate amplifier voltage supply B+. When a relatively weak signal is received at the antenna, however, the gain control voltage initially developed is less in amplitude than for a strong signal, with the result that the control grid of the intermediate frequency amplifier tube 43 is biased less negative, thus permitting a greater current flow in the output circuit, with the result that the potential at point 50 is decreased.

It is apparent, therefore, that the sliding screen voltage supply for the automatic gain control amplifier operates in the same manner as in Fig. 1. Again, the sliding screen voltage supply may be considered as controlled by varying the impedance in a voltage dividing network in which the impedances 44, 45, 46 and the discharge path of the pentode 43 comprise the voltage divider which is connected across the anode voltage plate supply for the pentode 43, and in which the automatic gain control voltage applied to the control grid of the tube 43 varies the discharge path impedance. The amplitude of the amplified received signal thus ultimately controls the operating characteristic of the gain control amplifying device.

It is understood, of course, that the circuit parameters and operating characteristics of the gain control amplifier and the auxiliary device 37 of Fig. 1, or of the tube 42 of controlled amplifier stage of Fig. 2, may be chosen so as to provide the desired screen grid potential range for the gain control amplifier tube 25.

While we have shown and described various specific embodiments of the invention, it will, of course, be understood by those skilled in the art that other modifications may be made without departing from the principles of the invention. It is therefore contemplated by the appended claims to cover any such modifications as fall within the true spirit and scope of our invention.

What we claim as new and desire to secure by Letters Patent of the United States is:

1. In a television superheterodyne receiving system having a carrier frequency signal amplifier and a video signal amplifier for amplifying demodulated composite video signals, an automatic gain control amplifier for providing a gain control voltage for said carrier frequency amplifier, said gain control amplifier comprising a discharge device having a cathode, an anode, a control electrode, and an auxiliary control electrode, input circuit means for supplying an output signal voltage from said video amplifier between said control electrode and said cathode, means for supplying a positive voltage to said auxiliary control electrode to determine the operating characteristic of the gain control amplifier, an output circuit connected between said cathode and said anode, and means responsive to the gain control voltage developed in said output circuit for decreasing the positive voltage applied to said auxiliary control electrode by an amount inversely proportional to the amplitude of the output signal voltage from said video amplifier.

2. In a television superheterodyne receiving system having a carrier frequency signal amplifier and a video signal amplifier for amplifying demodulated composite video signals, an automatic gain control amplifier for supplying gain control voltage to said carrier frequency amplifier, said gain control amplifier comprising a discharge device having a cathode, an anode, a control electrode, and an auxiliary control electrode, input circuit means for supplying an output signal voltage from said video amplifier between said control electrode and said cathode, a voltage dividing network including a variable impedance device coupled to a direct current source, said variable impedance device having a voltage responsive control electrode for varying the impedance thereof, means connecting said auxiliary control electrode to said voltage divider to provide a positive voltage for determining the operating characteristic of the gain control amplifier, and an output circuit connected between said cathode and said anode for providing said gain control voltage, means connecting said output circuit to said control electrode of said variable impedance device for decreasing the positive voltage applied to said auxiliary control electrode by an amount inversely proportional to the amplitude of the output signal voltage from said video amplifier.

References Cited in the file of this patent

UNITED STATES PATENTS

| | | |
|---|---|---|
| 2,293,528 | Barco et al. | Aug. 18, 1942 |
| 2,356,141 | Applegarth | Aug. 22, 1944 |
| 2,593,011 | Cotsworth | Apr. 15, 1952 |
| 2,606,247 | Fyler | Aug. 5, 1952 |
| 2,609,443 | Avins | Sept. 2, 1952 |
| 2,632,802 | Vilkomerson et al. | Mar. 24, 1953 |

FOREIGN PATENTS

| | | |
|---|---|---|
| 851,411 | France | Jan. 9, 1940 |
| 858,486 | France | Nov. 26, 1940 |
| 525,629 | Great Britain | Sept. 2, 1940 |